(12) United States Patent
Deferme

(10) Patent No.: US 12,085,138 B2
(45) Date of Patent: Sep. 10, 2024

(54) DAMPER ASSEMBLY WITH ACCUMULATOR

(71) Applicant: DRiV Automotive Inc., Lake Forest, IL (US)

(72) Inventor: Stefan Deferme, Heusden-Zolder (BE)

(73) Assignee: DRiV Automotive Inc., Northville, MI (US)

( * ) Notice: Subject to any disclaimer, the term of this patent is extended or adjusted under 35 U.S.C. 154(b) by 423 days.

(21) Appl. No.: 17/462,322

(22) Filed: Aug. 31, 2021

(65) Prior Publication Data

US 2023/0063491 A1    Mar. 2, 2023

(51) Int. Cl.
| F16F 7/00 | (2006.01) |
| B23K 26/28 | (2014.01) |
| B23K 101/00 | (2006.01) |
| B62D 21/11 | (2006.01) |
| B62D 27/02 | (2006.01) |
| B62D 65/02 | (2006.01) |

(52) U.S. Cl.
CPC ............... *F16F 7/00* (2013.01); *B23K 26/28* (2013.01); *B62D 21/11* (2013.01); *B62D 27/02* (2013.01); *B62D 65/02* (2013.01); *B23K 2101/006* (2018.08)

(58) Field of Classification Search
CPC .. F16F 7/00; F16F 9/065; F16F 9/3271; F16F 2226/045; F16F 2226/048; B62D 27/02; B62D 21/11; B62D 65/02; B23K 26/28; B23K 2101/006
See application file for complete search history.

(56) References Cited

U.S. PATENT DOCUMENTS

| 4,614,255 | A | 9/1986 | Morita | |
| 5,398,789 | A * | 3/1995 | Handke | F16F 9/325 29/434 |
| 8,469,162 | B2 * | 6/2013 | Nishimura | F16F 9/325 188/266.2 |
| 11,454,292 | B2 * | 9/2022 | Deferme | F16F 9/512 |
| 2011/0017559 | A1 | 1/2011 | Sintorn | |
| 2013/0081913 | A1 * | 4/2013 | Nowaczyk | B23K 11/14 188/315 |
| 2020/0208705 | A1 * | 7/2020 | Deferme | B60G 13/08 |
| 2021/0131522 | A1 | 5/2021 | Lun, II et al. | |
| 2022/0252125 | A1 * | 8/2022 | Deferme | F16F 9/061 |

FOREIGN PATENT DOCUMENTS

| DE | 102005023235 B3 | 9/2006 |
| DE | 102015104489 A1 | 9/2016 |
| JP | S61191406 A | 8/1986 |

OTHER PUBLICATIONS

Extended European Search Report dated Feb. 2, 2023 relating to EP Application No. 22190288.5 (84 pages).

\* cited by examiner

*Primary Examiner* — Pamela Rodriguez
(74) *Attorney, Agent, or Firm* — Bejin Bieneman PLC

(57) ABSTRACT

A method for assembling a damper assembly includes securing a damper interface to an external surface of a pressure tube. The method includes securing an accumulator interface to an external surface of an accumulator tube. The method includes, after the damper interface is secured to the pressure tube and the accumulator interface is secured to the accumulator tube, securing the pressure tube to the accumulator tube by press fitting the damper interface to the accumulator interface.

20 Claims, 10 Drawing Sheets

DAMPER ASSEMBLY WITH ACCUMULATOR

BACKGROUND

Dampers are typically used in conjunction with automotive suspension systems or other suspension systems to control movement of wheels of a vehicle relative to a body of the vehicle. In order to control movement, dampers are generally connected between the sprung (body) and the unsprung (suspension/drivetrain) masses of the vehicle.

DETAILED DESCRIPTION

A method for assembling a damper assembly includes securing a damper interface to an external surface of a pressure tube and securing an accumulator interface to an external surface of an accumulator tube. Then, after securing the damper interface to the pressure tube and securing the accumulator interface to the accumulator tube, the method includes securing the pressure tube to the accumulator tube by press fitting the damper interface to the accumulator interface. The press fit maintains positioning of the accumulator to relative to the pressure tube, e.g., while the damper interface and the accumulator interface are further secured and without requiring a jig or other tooling to hold the accumulator and/or the pressure tube in place. The damper interface and the accumulator interface may be further secured, for example, via laser welding.

Figure 1:
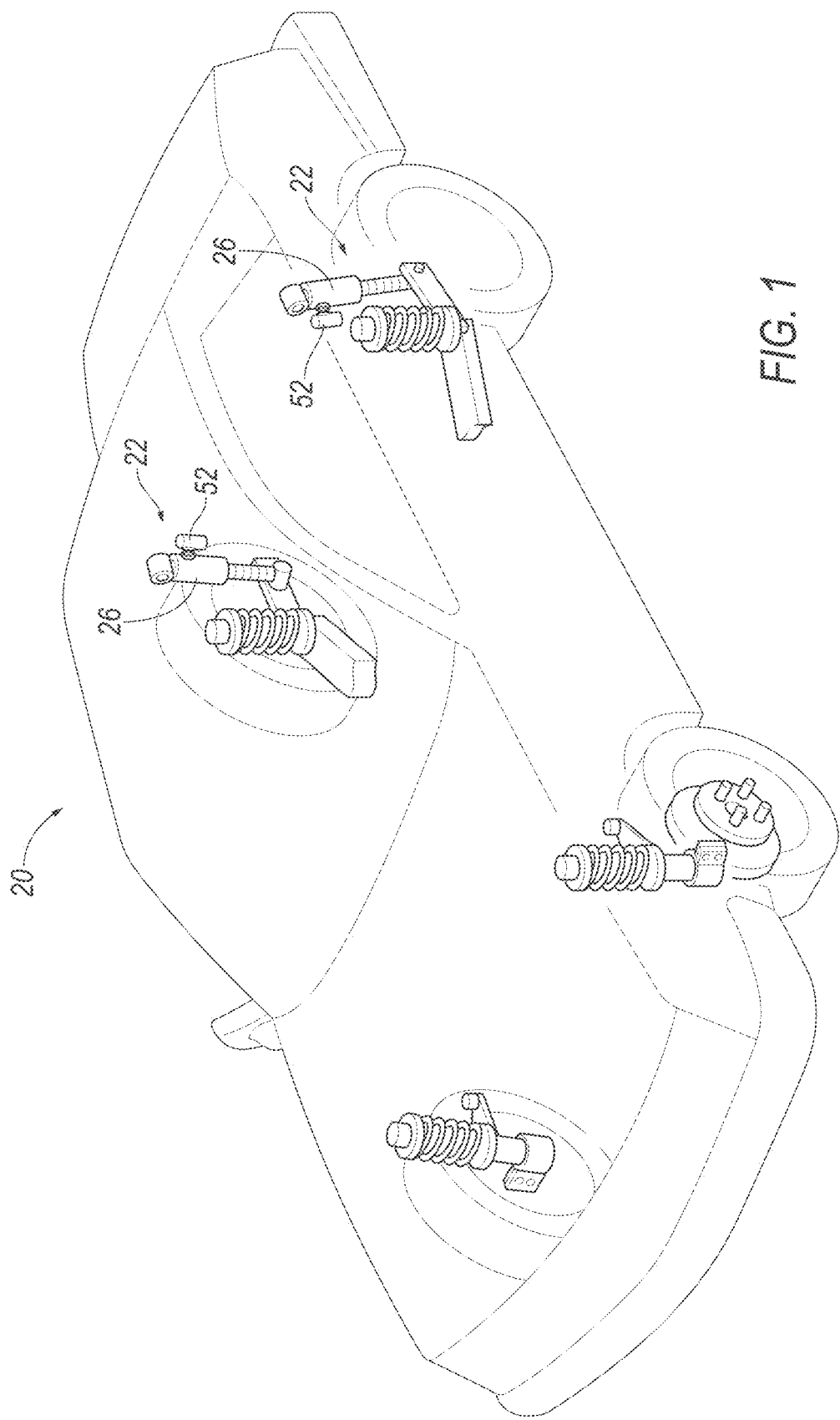
FIG. 1 is a perspective view of a vehicle having a plurality of damper assemblies.
Figure 2:
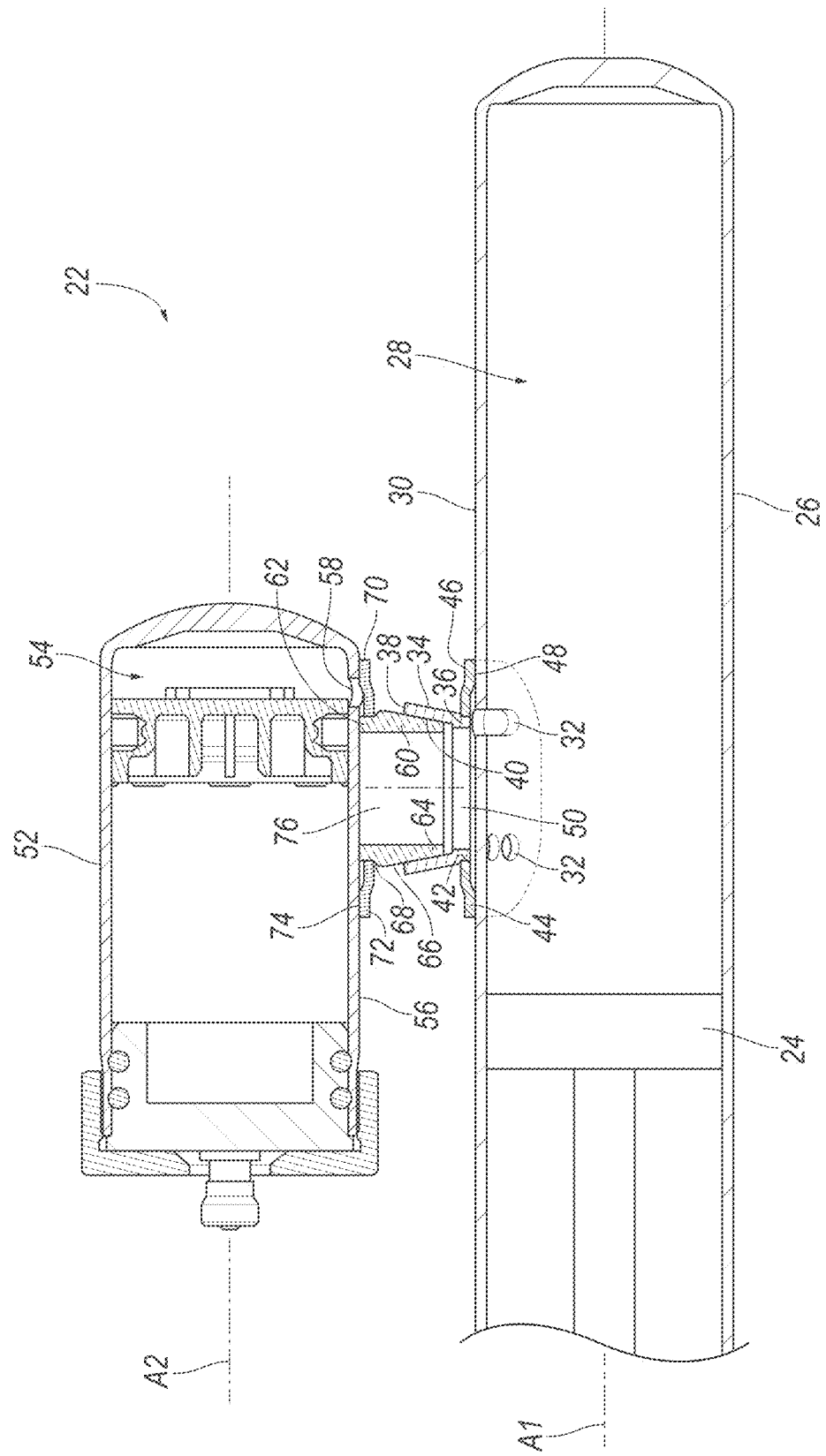
FIG. 2 is a cross-sectional view of one of the damper assemblies.

With reference to FIGS. 1 and 2, and wherein like numerals indicate like elements throughout the several views, a vehicle 20 having a plurality of damper assemblies 22 is shown. The vehicle 20 may be any suitable type of ground vehicle, e.g., a passenger or commercial automobile such as a sedan, a coupe, a truck, a sport utility, a crossover, a van, a minivan, a taxi, a bus, etc.

The damper assemblies 22 are typically used in conjunction with automotive suspension systems or other suspension systems to control movement of wheels of the vehicle 20 relative to a body of the vehicle 20. In order to control movement, damper assemblies 22 are generally connected between the sprung (body) and the unsprung (suspension/drivetrain) masses of the vehicle 20. Each damper assembly 22 may be coupled with a coil spring. Each damper assembly 22 is movable from a compressed position to an extended position, and vice versa. A distance between ends of the damper assembly 22 is less in the compressed position than in the extended position. The coil springs, or the like, may urge the damper assemblies 22 toward the extended positions. Force applied to wheels of the vehicle 20, e.g., from bumps, potholes, etc., may urge to damper assemblies 22 toward the compressed position.

Each damper assembly 22 controls movement of respective wheels by limiting fluid flow into, out of, and/or between various chambers of the damper assembly 22, e.g., into, out of, and/or between a compression chamber and a rebound chamber. Fluid movement is caused by movement of a piston 24 within a pressure tube 26 of the damper assembly 22, e.g., when the damper assembly 22 is moved toward the compressed position or the extended position.

The pressure tube 26 is hollow and defines a first chamber 28 therein. The first chamber 28 may be filled with a hydraulic fluid. The pressure tube 26 has a first external surface 30 that faces outward and away from the first chamber 28. The pressure tube 26 is elongated along a tube axis A1. The pressure tube may include one or more pressure tube openings 32 that permit fluid flow into and/or out of the first chamber 28. The pressure tube opening 32 may be between ends of the pressure tube 26, permitting radial (relative to the tube axis A1) fluid flow into and/or out of the first chamber 28.

Figure 3:
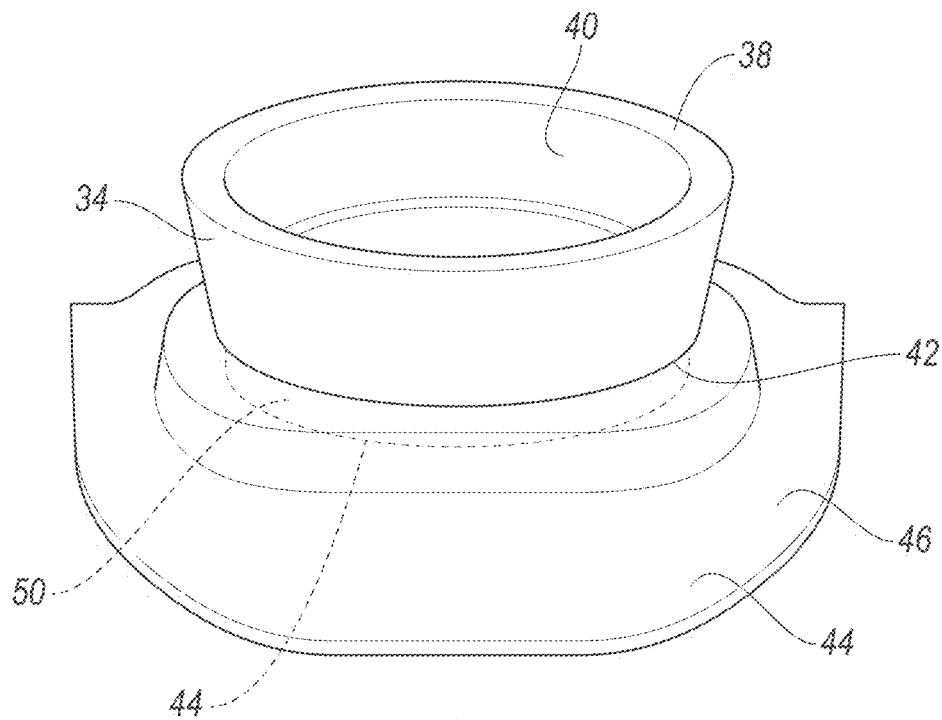
FIG. 3 is a perspective view of a damper interface and a damper cap of the damper assembly.

With reference to FIGS. 2 and 3, the damper assembly 22 includes a damper interface 34. The damper interface 34 may be annular, i.e., ring shaped. The damper interface 34 may extend, e.g., from a first proximate end 36 to a first distal end 38 opposite the first proximate end 36. The damper interface 34 may include a first conical interface surface 40. The first conical interface surface 40 may surround an interior of the damper interface 34. The first conical interface surface 40 may define a diameter that is largest at the first distal end 38 and decreases toward the first proximate end 36. The damper interface 34 may include a first step 42. An outer diameter of the damper interface 34 may be smaller on one side of the first step 42, e.g., proximate the first distal end 38, than on an opposite side of the first step 42. The damper interface 34 may be secured to the first external surface 30 of the pressure tube 26, e.g., at the pressure tube opening 32.

The damper assembly 22 may include a damper cap 44 that connects the pressure tube 26 to the damper interface 34. The damper cap 44 may be secured to first external surface 30 of the pressure tube 26 and to the damper interface 34, e.g., fixed via weld. The damper cap 44 may be fixed between the damper interface 34 and the first external surface 30 of the pressure tube 26. The damper cap 44 may include a first top surface 46 and a first bottom surface 48 opposite the first top surface 46. The first top surface 46 may abut the damper interface 34 and the first bottom surface 48 may abut the pressure tube 26. The first bottom surface 48 may be complementary in shape to the first external surface 30 of the pressure tube 26. In other words, the first bottom surface 48 may mirror a contour of the first external surface 30, e.g., such that the first bottom surface 48 of the damper cap 44 continuously abuts the first external surface 30 of the pressure tube 26 about the pressure tube opening 32. The damper cap 44 may include a first center opening 50, e.g., extending from the first top surface 46 to the first bottom surface 48. The damper cap 44 may surround the first center opening 50. The damper cap 44 may surround the damper interface 34. For example, the first proximate end of the damper interface may be disposed within the first center opening 50 of the damper cap 44, e.g., with the first step 42 of the damper interface 34 abutting the first top surface 46 and the first distal end 38 spaced from the pressure tube 26 and the damper cap 44.

Figure 4:
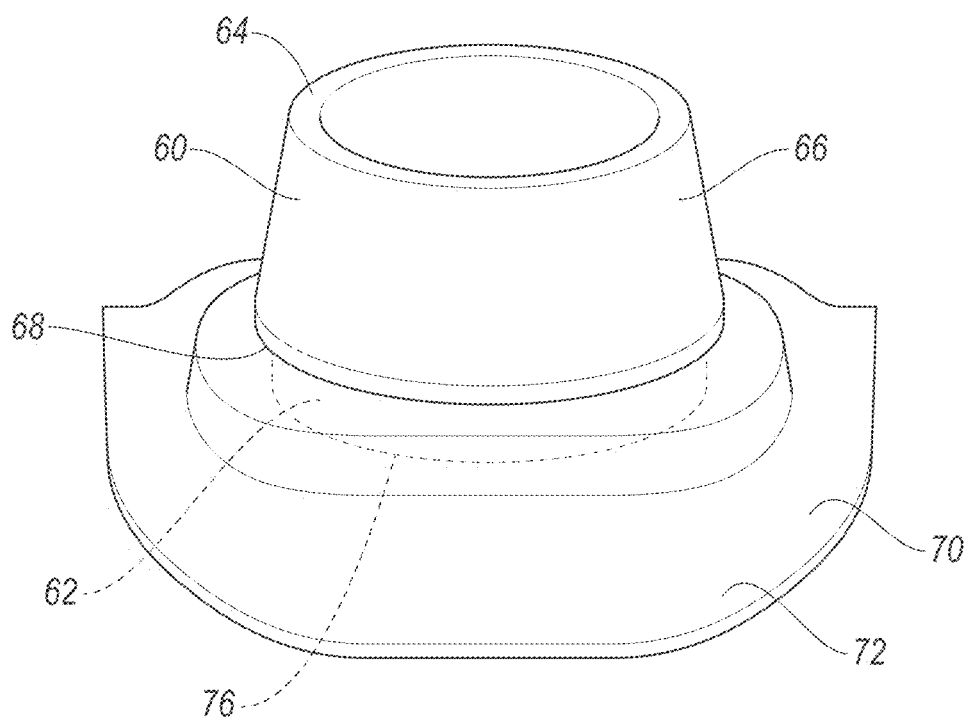
FIG. 4 is a perspective view of an accumulator interface and an accumulator cap of the damper assembly.

With reference to FIGS. 2 and 4, the damper assembly 22 includes an accumulator tube 52 that provides a reservoir for hydraulic fluid of the damper assembly 22. The accumulator tube 52 is hollow and defines a second chamber 54 therein. The second chamber 54 may be filled with hydraulic fluid. The accumulator tube 52 has a second external surface 56 that faces outward and away from the second chamber 54. The accumulator tube 52 is elongated along an accumulator axis A2. The accumulator tube 52 may include an accumulator opening 58 that permits fluid flow into and/or out of the second chamber 54. The accumulator opening 58 may be between ends of the accumulator tube 52, permitting radial (relative to the accumulator axis A2) fluid flow into and/or out of the second chamber 54. The accumulator tube 52 may include a floating piston therein that separates the second chamber 54 from a gas chamber on an opposite side of the floating piston within the accumulator tube 52. The floating piston can move axially within the second chamber 54, e.g., varying a volume of the second chamber 54 according to the fluid volume therein.

The damper assembly 22 includes an accumulator interface 60. The accumulator interface 60 may be annular, i.e., ring shaped. The accumulator interface 60 may extend, e.g., from a second proximate end 62 to a second distal end 64 opposite the second proximate end 62. The accumulator interface 60 may include a second conical interface surface 66. The second conical interface surface 66 may surround an exterior of the accumulator interface 60. The second conical interface surface 66 may define a diameter that is smallest at the second distal end 64 and increases toward the second proximate end 62. The accumulator interface 60 may include a second step 68. An outer diameter of the accumulator interface 60 may be smaller on one side of the second step 68, e.g., proximate the second distal end 64, than on an opposite side of the second step 68. The accumulator interface 60 may be secured to the second external surface 56 of the accumulator tube 52, e.g., at the accumulator opening 58.

The damper assembly 22 may include an accumulator cap 70 that connects the accumulator tube 52 to the accumulator interface 60. The accumulator cap 70 may be secured to second external surface 56 of the accumulator tube 52 and to the accumulator interface 60, e.g., fixed via weld. The accumulator cap 70 may be fixed between the accumulator interface 60 and second external surface 56 of the accumulator tube 52. The accumulator cap 70 may include a second top surface 72 and a second bottom surface 74 opposite the second top surface 72. The second top surface 72 may abut the accumulator interface 60 and the second bottom surface 74 may abut the accumulator tube 52. The second bottom surface 74 may be complementary in shape to the second external surface 56 of the accumulator tube 52. In other words, the second bottom surface 74 may mirror a contour of the second external surface 56, e.g., such that the second bottom surface 74 of the accumulator cap 70 continuously abuts the second external surface 56 of the accumulator tube 52 about the accumulator opening 58. The accumulator cap 70 may include a second center opening 76, e.g., extending from the second top surface 72 to the second bottom surface 74. The accumulator cap 70 may surround the second center opening 76. The accumulator cap 70 may surround the accumulator interface 60. For example, the second proximate end 62 of the accumulator interface 60 may be disposed within the second center opening 76 of the accumulator cap 70, e.g., with the second step 68 of the accumulator interface 60 abutting the second top surface 72 and the second distal end 64 spaced from the accumulator tube 52 and the accumulator cap 70.

The damper interface 34 and the accumulator interface 60 collectively enable connection of the pressure tube 26 and the accumulator tube 52. The first chamber 28 of the pressure tube 26 and the second chamber 54 are in fluid communication via the damper interface 34 and the accumulator interface 60. In other words, fluid may flow from the pressure tube 26 to the accumulator tube 52 (or vice versa) through the damper interface 34 and the accumulator interface 60. The damper interface 34 may surround the accumulator interface 60. For example, the second distal end 64 of the accumulator interface 60 may be disposed within the first distal end 38 of the damper interface 34. The first conical interface surface 40 of the damper interface 34 may abut the second conical interface surface 66 of the accumulator interface 60. The accumulator interface 60 may press fit to the damper interface 34. For example, normal forces between the first conical interface surface 40 and the second conical interface surface 66 may maintain orientation and position of the pressure tube 26 relative to the accumulator tube 52. The press fit can include an interference fit between the damper interface 34 and the accumulator interface 60. For example, prior to insertion of the accumulator interface 60 into the damper interface 34, diameters of the first conical interface surface 40 may be slightly smaller than diameters of the second conical interface surface 66 such that insertion of the accumulator interface 60 into the damper interface 34 deforms the first conical interface surface 40 and/or the second conical interface surface 66. The accumulator interface 60 may be fixed, e.g., welded, to the damper interface 34.

Figure 5:
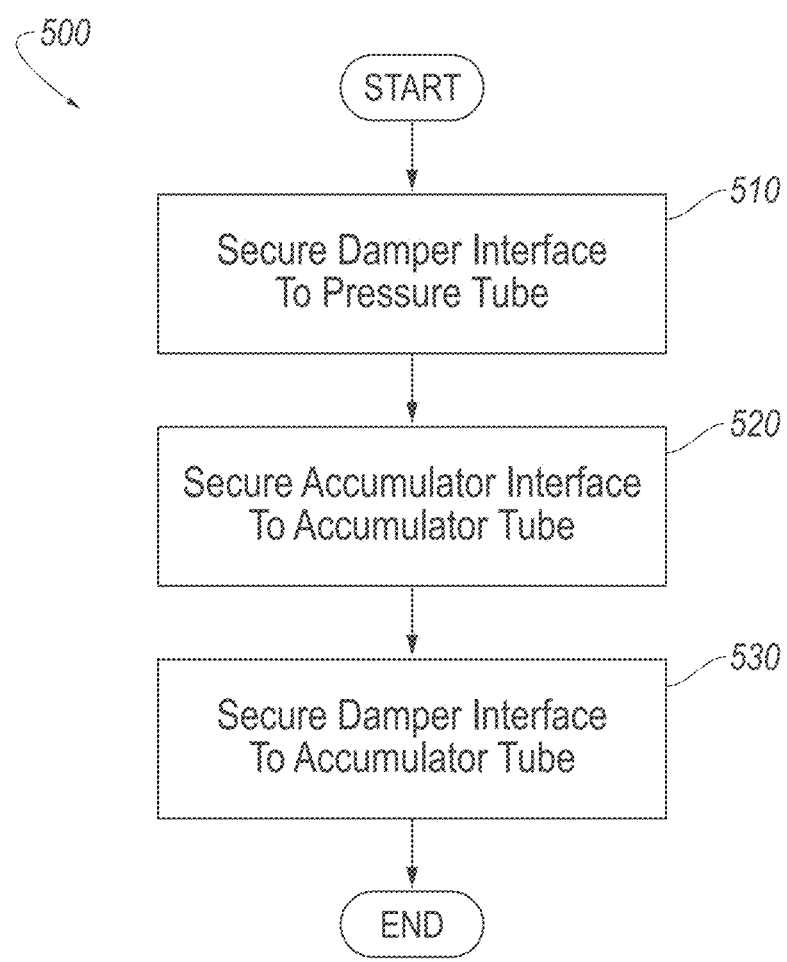
FIG. 5 is a flow chart illustrating a process for assembling the damper assembly.

With reference to FIG. 5, a flowchart illustrating a process 500 for securing the accumulator of the damper assembly 22 to the pressure tube 26 of the damper assembly 22 is shown. The process 500 begins at a step 510 where the damper interface 34 is secured to the first external surface 30 of the pressure tube 26. Securing the damper interface 34 to the first external surface 30 of the pressure tube 26 can include securing the damper interface to the damper cap 44 and securing the damper cap 44 to the first external surface 30 of the pressure tube 26. The damper cap 44 may be secured to the damper interface before the damper cap 44 is secured to the pressure tube 26.

Figure 6:
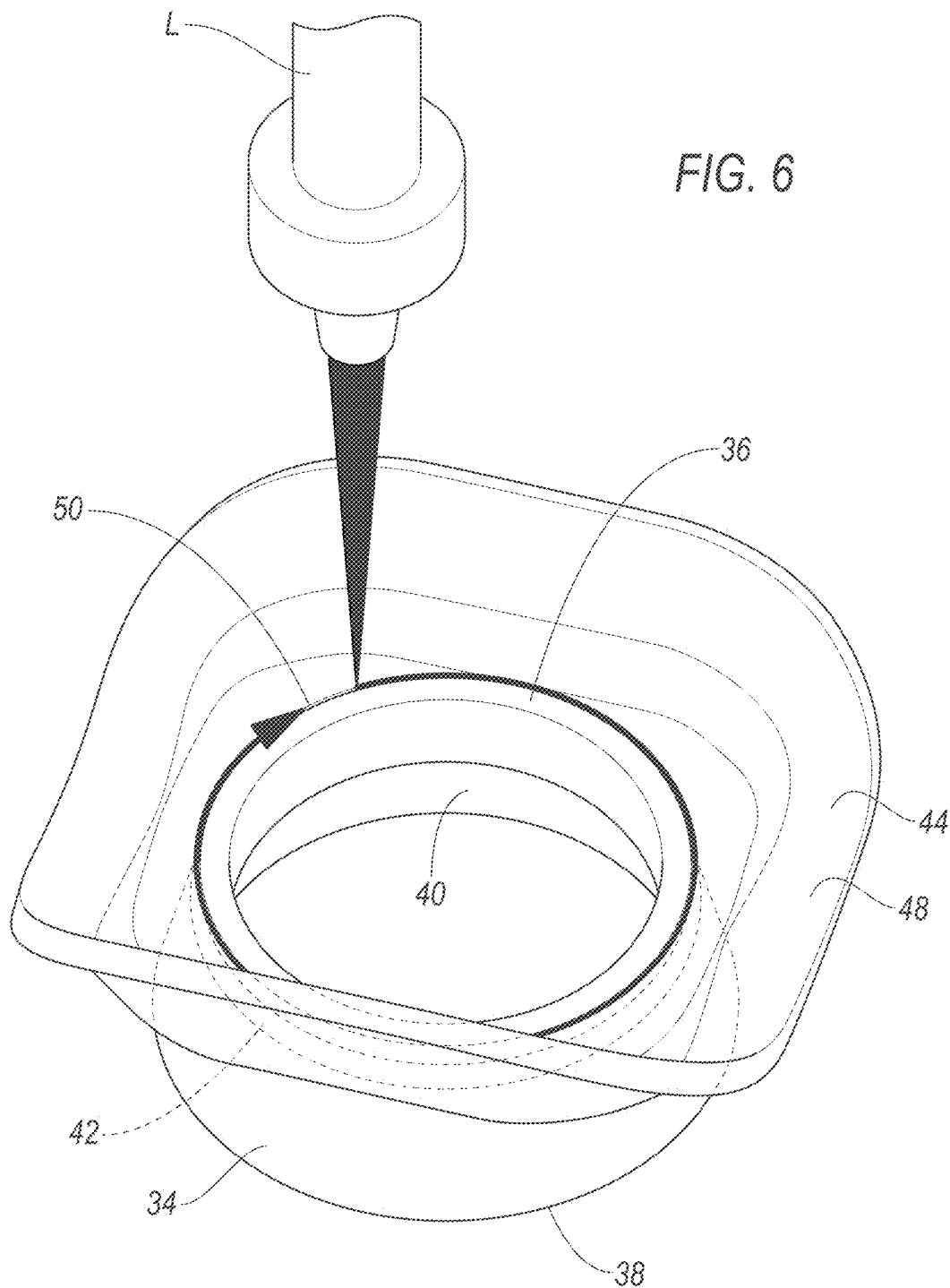
FIG. 6 is a perspective view of the damper interface being secured to the damper cap.
Figure 7:
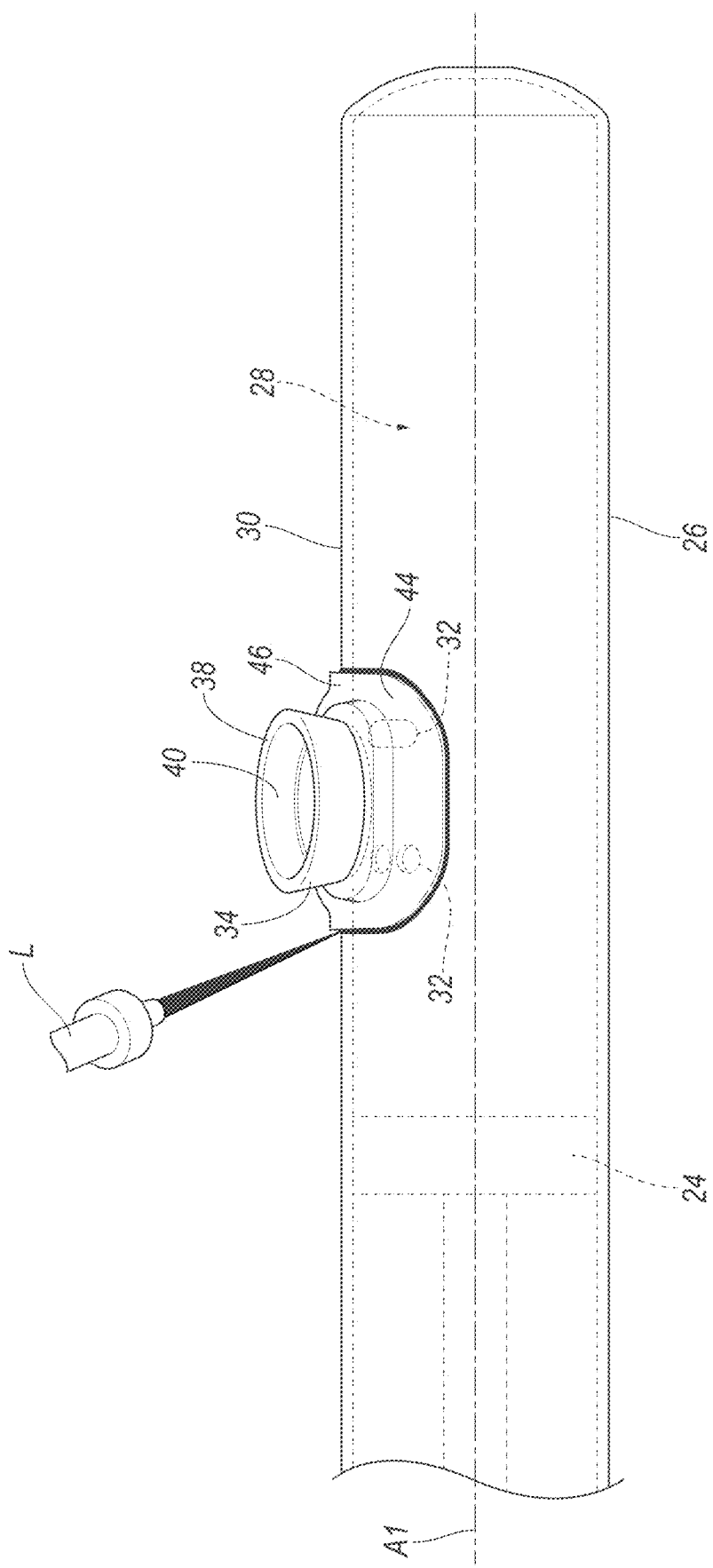
FIG. 7 is a perspective view of the damper cap being secured to a pressure tube of the damper assembly.

The damper cap 44 may be secured to the damper interface 34 by inserting the first proximate end 36 into the first center opening 50 of the damper cap 44, e.g., from the first top surface 46 and until the first step 42 abuts first top surface 46. The damper cap 44 may then be fixed, e.g., welded, to the damper interface 34. For example, a laser L may be used to weld the first distal end 38 to the damper cap 44 at the first bottom surface 48 and about a perimeter of the first center opening 50 and the first distal end 38, as shown in FIG. 6. Next, the damper cap 44 may be secured, e.g., welded, to the first external surface 30 of the pressure tube 26. For example, the laser L may be used to weld the damper cap 44 to the first external surface 30 of the pressure tube 26 about a perimeter of the damper cap 44, as shown in FIG. 7.

At a step 520 of the process 500 the accumulator interface 60 is secured to the second external surface 56 of the accumulator tube 52. Securing the accumulator interface 60 to the second external surface 56 of the accumulator tube 52 can include securing the accumulator interface 60 to the accumulator cap 70 and securing the accumulator cap 70 to the second external surface 56 of the accumulator tube 52. The accumulator cap 70 may be secured to the accumulator interface 60 before the accumulator cap 70 is secured to the accumulator tube 52.

Figure 8:
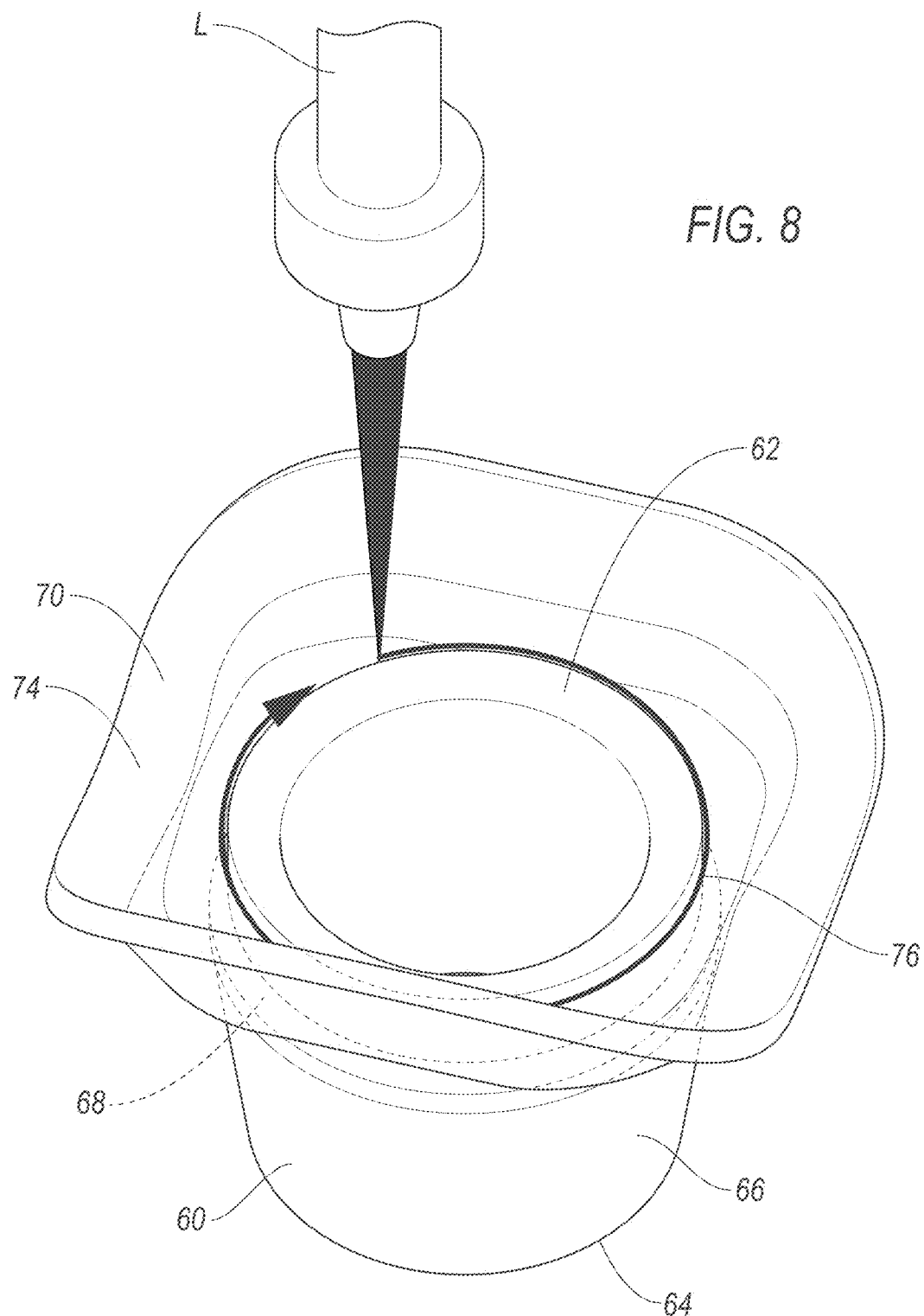
FIG. 8 is a perspective view of the accumulator interface being secured to the accumulator cap.
Figure 9:
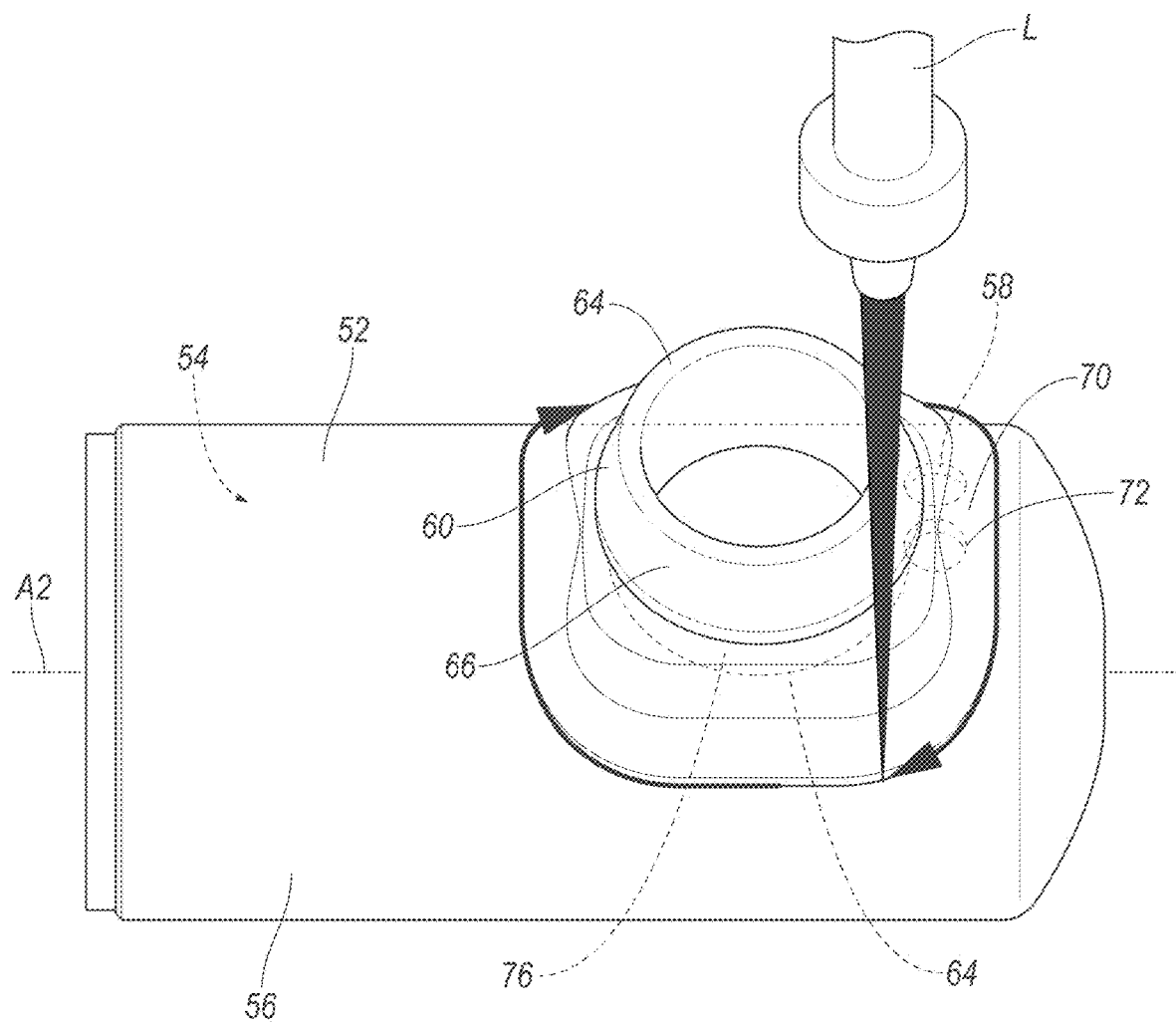
FIG. 9 is a perspective view of the accumulator cap being secured to an accumulator of the damper assembly.

The accumulator cap 70 may be secured to the accumulator interface 60 by inserting the second proximate end 62 into the second center opening 76 of the accumulator cap 70, e.g., from the second top surface 72 and until the second step 68 abuts second top surface 72. The accumulator cap 70 may then be fixed, e.g., welded, to the accumulator interface 60. For example, the laser L may be used to weld the second distal end 64 to the accumulator cap 70 at the second bottom surface 74 and about a perimeter of the second center opening 76 and the second distal end 64, as shown in FIG. 8. Next, the accumulator cap 70 may be secured, e.g., welded, to the second external surface 56 of the accumulator tube 52. For example, the laser L may be used to weld the accumulator cap 70 to the second external surface 56 of the accumulator tube 52 about a perimeter of the accumulator cap 70, as shown in FIG. 9.

Figure 10:
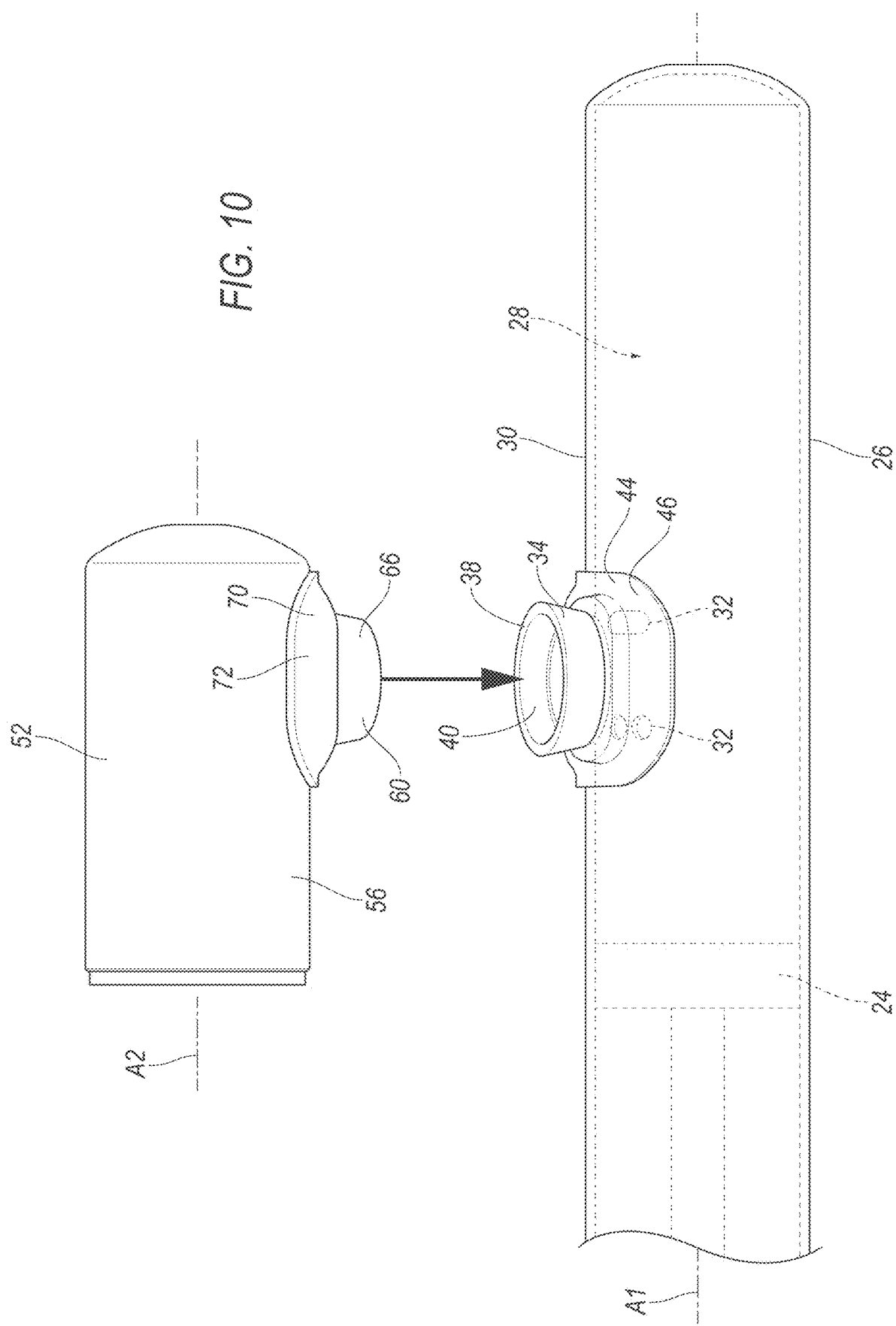
FIG. 10 is a perspective view of pressing the damper interface to the accumulator interface.
Figure 11:
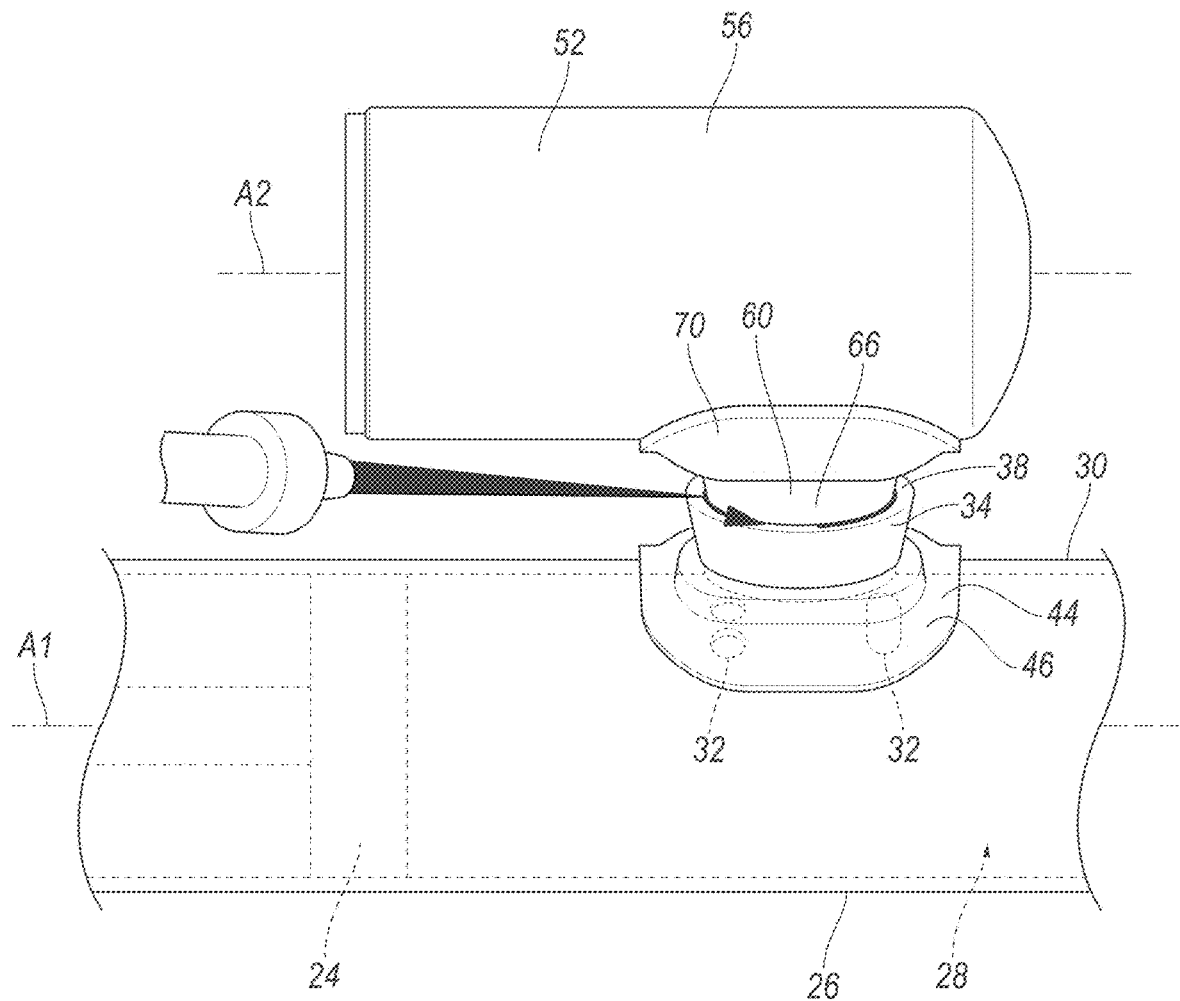
FIG. 11 is a perspective view of the damper interface being secured to the accumulator interface.

At a step 530, after securing the damper interface 34 to the pressure tube 26 and securing the accumulator interface 60 to the accumulator tube 52, the pressure tube 26 is secured to the accumulator tube 52. The pressure tube 26 may be secured to the accumulator tube 52 by press fitting the damper interface 34 to the accumulator interface 60. For example, the second distal end 64 of the accumulator interface 60 may be inserted into the first distal end 38 of the damper assembly 22, as illustrated in FIG. 10. Press fitting the damper interface 34 on the accumulator interface 60 can include pressing the first conical interface surface 40 and the second conical interface into abutment. In the case of an interference fit, sufficient force may be applied to the damper interface 34 and the accumulator interface 60 to slightly deform the first conical interface surface 40 and/or the second conical interface. After press fitting the damper interface 34 on the accumulator interface 60, the damper interface 34 may be fixed, e.g., welded, to the accumulator interface 60. For example, the laser L may be used to weld the damper interface 34 to the accumulator interface 60 about a perimeter of the damper interface 34 and the accumulator interface 60, as shown in FIG. 11. The press fitting may provide sufficient securement to maintain a position of the pressure tube 26 relative to the accumulator tube 52 while welding the damper interface 34 to the accumulator interface 60, e.g., without requiring a jig or other fixture to support the accumulator tube 52 relative to the pressure tube 26.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method for assembling a damper assembly, the method comprising:
   securing a damper interface to an external surface of a pressure tube;
   securing an accumulator interface to an external surface of an accumulator tube; and
   then, after securing the damper interface to the pressure tube and securing the accumulator interface to the accumulator tube, securing the pressure tube to the accumulator tube by press fitting the damper interface to the accumulator interface.

2. The method of claim 1, further comprising welding the damper interface to the accumulator interface after press fitting the damper interface on the accumulator interface.

3. The method of claim 2, wherein the press fitting provides sufficient securement to maintain a position of the pressure tube relative to the accumulator tube while welding the damper interface to the accumulator interface.

4. The method of claim 2, wherein welding the damper interface to the accumulator interface includes laser welding.

5. The method of claim 1, wherein the damper interface and the accumulator interface each include a conical interface surface, and press fitting the damper interface on the accumulator interface includes pressing the conical interface surfaces into abutment.

6. The method of claim 1, wherein the press fitting includes an interference fit between the damper interface and the accumulator interface.

7. The method of claim 1, wherein securing the damper interface to the external surface of the pressure tube includes securing a damper cap to the damper interface and to the external surface of the pressure tube.

8. The method of claim 7, wherein the damper cap is secured to the damper interface before the damper cap is secured to the pressure tube.

9. The method of claim 8, wherein securing the damper cap to the external surface of the pressure tube includes welding the damper cap to the external surface of the pressure tube.

10. The method of claim 9, wherein securing the damper cap to the damper interface includes welding the damper cap to the damper interface.

11. A damper assembly comprising:
    a pressure tube elongated having a first external surface;
    a damper interface secured to the first external surface;
    an accumulator having a second external surface; and
    an accumulator interface secured to the second external surface, the accumulator interface press fit with the damper interface, the press fit including an interference fit between the damper interface and the accumulator interface.

12. The damper assembly of claim 11, wherein the damper interface includes a first conical interface surface and the accumulator interface includes a second conical interface surface abutting the first conical interface surface.

13. The damper assembly of claim 11, further comprising a damper cap secured to the damper interface and to the first external surface of the pressure tube, the damper cap between the damper interface and the first external surface of the pressure tube.

14. The damper assembly of claim 11, wherein the pressure tube defines a first chamber and the accumulator defines a second chamber, and the first chamber and the second chamber are in fluid communication via the accumulator interface and the damper interface.

15. The damper assembly of claim 11, wherein the accumulator interface is welded to the damper interface.

16. The damper assembly of claim 11, wherein the damper interface surrounds the accumulator interface.

17. A damper assembly comprising:
   a pressure tube elongated having a first external surface;
   a damper interface secured to the first external surface;
   an accumulator having a second external surface;
   an accumulator interface secured to the second external surface, the accumulator interface press fit with the damper interface; and
   a damper cap secured to the damper interface and to the first external surface of the pressure tube, the damper cap between the damper interface and the first external surface of the pressure tube.

18. The damper assembly of claim 17, wherein the damper cap surrounds the damper interface.

19. The damper assembly of claim 17, wherein the damper cap includes a surface complementary to the first external surface of the pressure tube.

20. The damper assembly of claim 17, wherein the damper cap is welded to the damper interface between the damper cap and the pressure tube.

\* \* \* \* \*